United States Patent
Brown et al.

(10) Patent No.: US 7,031,937 B2
(45) Date of Patent: Apr. 18, 2006

(54) METHOD AND APPARATUS FOR TAX EFFICIENT INVESTMENT MANAGEMENT

(75) Inventors: Daniel P. Brown, Wauwatosa, WI (US); David W. Schulz, Mequon, WI (US)

(73) Assignee: Marshall & Ilsley Corporation, Milwaukee, WI (US)

( * ) Notice: Subject to any disclaimer, the term of this patent is extended or adjusted under 35 U.S.C. 154(b) by 634 days.

(21) Appl. No.: 10/051,893

(22) Filed: Jan. 18, 2002

(65) Prior Publication Data

US 2002/0059127 A1 May 16, 2002

Related U.S. Application Data

(63) Continuation-in-part of application No. 09/322,412, filed on May 28, 1999.

(51) Int. Cl.
 *G06Q 40/00* (2006.01)
(52) U.S. Cl. .................................... 705/36 T; 705/37
(58) Field of Classification Search ............ 705/35–36, 705/36 T, 37
 See application file for complete search history.

(56) References Cited

U.S. PATENT DOCUMENTS

| 4,933,842 A | 6/1990 | Durbin et al. |
| 5,101,353 A | 3/1992 | Lupien et al. |

(Continued)

FOREIGN PATENT DOCUMENTS

JP 56-31158 3/1981

OTHER PUBLICATIONS

Willens, Robert, "IRS Broadens the Definition of Wash Sales: Can Cottage Savings Carry the Day? Note the discussion of wash sale rule changes and the effects on investing"; CPA Journal, v62, n7, p48, Jul., 1992.

(Continued)

*Primary Examiner*—Andrew Joseph Rudy
(74) *Attorney, Agent, or Firm*—Reinhart Boerner Van Deuren s.c.

(57) ABSTRACT

A method and apparatus for automatically managing investment portfolios is disclosed which substantially tracks a selected index and automatically harvests tax losses. The system includes an accounting system for maintaining tax lot information for individual accounts, an optimization system for rebalancing each account to substantially model the index and for harvesting tax losses, and a trading system for executing trades. Each investor owns the securities in his/her account, and therefore, harvested losses can be used to offset capital gains. Securities sold to harvest tax losses are repurchased at a later time selected to avoid application of the Internal Revenue Service wash sale rules, with exchange traded funds (ETF's) from the same technological sector as the securities being sold to harvest tax losses being used as temporary replacement securities for the portfolios.

32 Claims, 3 Drawing Sheets

U.S. PATENT DOCUMENTS

| | | |
|---|---|---|
| 5,126,936 A | 6/1992 | Champion et al. |
| 5,132,899 A | 7/1992 | Fox |
| 5,193,056 A | 3/1993 | Boes |
| 5,214,579 A | 5/1993 | Wolfberg et al. |
| 5,644,727 A | 7/1997 | Atkins |
| 5,761,442 A | 6/1998 | Barr et al. |
| 5,774,880 A | 6/1998 | Ginsberg |
| 5,806,048 A | 9/1998 | Kiron et al. |
| 5,819,238 A | 10/1998 | Fernholz |
| 6,029,146 A | 2/2000 | Hawkins |
| 6,115,697 A * | 9/2000 | Gottstein ............... 705/35 |
| 6,161,098 A | 12/2000 | Wallman |
| 6,278,983 B1 | 8/2001 | Ball |
| 6,393,409 B1 | 5/2002 | Young et al. |

OTHER PUBLICATIONS

Chase (Manhattan Private Bank)—Vogel Consulting Group, S.C., Chase Tax-Efficient Portfolio (TEP), pp. 5-11, Dec. 5, 1998.

Okoh, Benedict O., Wynant, Nancy, Chase (Manhattan Private Bank)—Vogel Consulting Group, S.C., Chase Tax-Efficient Portfolio (TEP), pp. 5-11, Dec. 5, 1998.

Fidelity Investments, "Portfolio Basics", www.personal421.fidelity.com, pp. 1-6, Copyright 1998-1999 FMR Corp.

Fidelity Investments, "Learn More About Annuities", www.personal321.fidelity.com, pp. 1-3, Copyright 1998-1999 FMR Corp.

Affinity Technology Group, Inc. website, at www.affi.net, Home, Real Time Decision Service, Related Services, RTDS Technical Walkthrough, Data Collection.

Wilshire Associates Incorporated website at www.wilshire.com, Wilshire 5000 Notes, Introduction to Wilshire Indexes, Corporate Information, The Wilshire Horizon, Wilshire Equator.

* cited by examiner

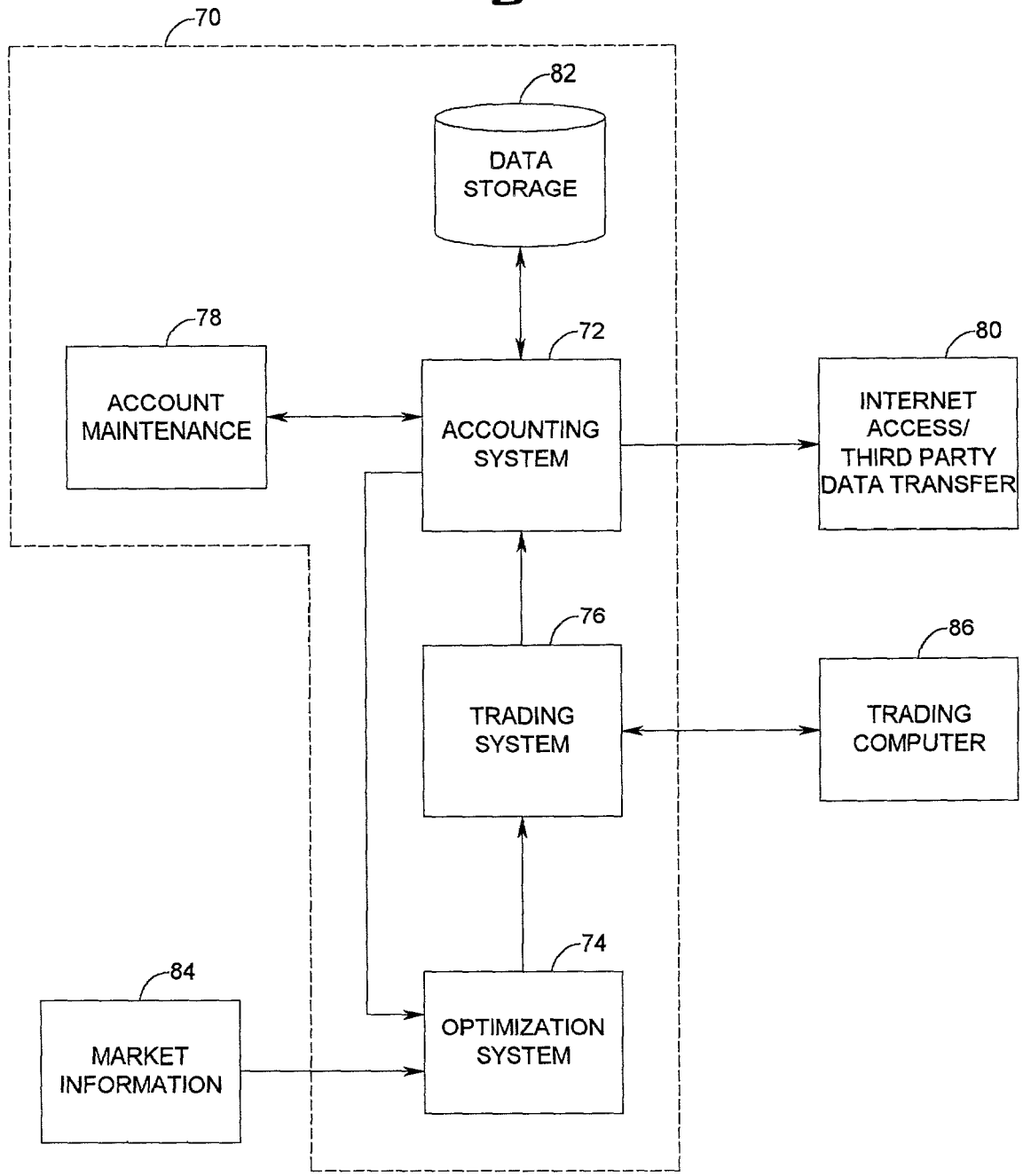

METHOD AND APPARATUS FOR TAX EFFICIENT INVESTMENT MANAGEMENT

IDENTIFICATION OF RELATED APPLICATION

This patent application is a continuation-in-part of U.S. patent application Ser. No. 09/322,412, filed on May 28, 1999, entitled "Method and Apparatus for Tax Efficient Investment Management," which is assigned to the assignee of the present invention.

BACKGROUND OF THE INVENTION

Field of the Invention

The present invention relates generally to a method and apparatus for managing investment portfolios, and more particularly to a method and apparatus for automatically managing an investment portfolio comprising a plurality of securities modeled on an index and for actively managing tax lots for individual investors.

One common goal of many investors today is diversification of financial holdings to minimize financial risk while pursuing returns which substantially meet or exceed the performance of indexes such as the Standard & Poor's 500 (S&P 500). Consequently, there are a number of financial products available today which provide a means for both small and large investors to easily diversify their holdings. Among these are mutual funds, annuities, and individually managed accounts. While all of these products provide the desired diversification, they suffer from disadvantages in terms of the cost associated with managing accounts, tax efficiency, or both.

Mutual funds are one common means for providing a diversified portfolio to investors. Mutual fund investments, however, are among the least tax efficient financial products in the marketplace, and are particularly unsuitable for medium to high net worth individuals because mutual funds cannot distribute losses. Therefore, investors can receive a taxable distribution, resulting from capital gains allocated among holders of the fund, even if they have a net loss in the investment in the fund. Furthermore, due to accumulated but undistributed capital gains in a fund, new investors may assume a tax deferred liability upon investing in the fund. Mutual funds, therefore, are not suitable investments for investors who require tax efficient investment performance. Furthermore, the performance of such funds frequently lag the performance of indexes such as the S&P 500, since performance is highly dependent on the skill of the manager.

Index funds are a subset of mutual funds designed to track the performance of an index such as the S&P 500. Generally, there are two types of index funds: passive index funds and enhanced index funds. Passive funds generally include all of the securities which comprise the index, weighted to match their weight in the index. These investment funds, therefore, track the performance of the index. In enhanced index funds, a fund manager selects a subset of the securities found in the index and determines the weighting of the various securities in the fund. Rather than matching the performance of the fund, the fund manager seeks to exceed the performance of the fund.

Both of these types of funds suffer from the same disadvantages, in terms of tax consequences, as mutual funds. Tax losses associated with the purchase and sale of individual securities held within the fund cannot be allocated among the investors. Furthermore, in the case of enhanced index funds, the performance of the fund is greatly affected by the performance of the fund manager.

Annuities offer another means for diversifying financial holdings. However, while taxes are deferred for annuity holders, annuities also suffer from disadvantages in terms of tax losses. Specifically, when an annuity is eventually converted, all of the capital gains generated are taxed as ordinary income. In many cases, the tax rate on ordinary income is higher than the capital gains tax which would have been paid on the investment.

Separately established individual accounts offer a means to diversify and to efficiently manage tax losses. However, due to the management resources which must be devoted to such accounts, the brokerage costs, and minimum purchase levels, costs are often prohibitive to all but a few wealthy investors. Individual accounts which seek to replicate an index fund are particularly difficult for small-to-medium net worth investors, since full replication of such an index fund in a manner allowing trading efficiencies requires a minimum investment, at present rates, of over a million dollars. For individual accounts that do not replicate an index, the effectiveness of the accounts depends heavily on the skill of the individual manager. Individually managed accounts often do not meet the performance of the S&P 500.

There remains a need, therefore, for a financial investment product that can provide a gross return that substantially tracks the returns of a selected index fund, while minimizing taxable gains through efficient use of individual tax lots, while simultaneously minimizing management costs. Preferably, this financial investment product should provide a means for small to medium sized investors to gain the financial advantages of both diversification and active tax management (tax loss harvesting).

It is therefore an objective of the invention to provide a financial investment product that provides diversified investments and tax loss harvesting for small to medium sized investors. It is another objective of the invention to provide an automated investment product for systematically harvesting tax losses.

It is yet another object of the invention to provide an automated investment product for small to medium investors for systematically rebalancing an investment portfolio to track an index fund. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a method and apparatus are provided for automatically, passively managing an individual investment portfolio for each of one or more investors while actively managing tax lots. An individual portfolio modeling an index is established for each investor, such that each investor owns each of the securities in his or her individual account. Because the securities are owned by the individual investor, losses can be harvested to offset gains for tax purposes. The investment portfolio is preferably periodically rebalanced to substantially model the selected index, as will be explained more thoroughly below.

Periodically, preferably at a time exceeding the minimum interval required by Internal Revenue Service wash sale rules, each of the securities in the investment portfolio is automatically evaluated for tax loss harvest purposes. For each tax lot, the difference between the present market value of the security and a past historical value of the security is calculated and compared to a predetermined tax loss threshold. If the difference meets or exceeds the tax loss threshold, the security is automatically sold to provide tax losses for offsetting gains in the portfolio.

The securities which are sold to harvest tax losses are temporarily replaced during the wash sale delay period with other securities in the same industry segment to maintain the appropriate industry balance in the account. In the parent of the present application, the replacement securities are selected to maintain the appropriate industry balance in the account after the tax loss harvest securities are sold; The preferred embodiment of the present invention instead uses shares of exchange traded funds (ETF's), which are closed-end funds, in the same industry segment as the securities which are being sold as temporary replacement securities during the wash sale delay period.

The investment portfolio is also automatically periodically rebalanced in the preferred embodiment based on a capitalization weight parameter and an index balance parameter. Preferably, the capitalization weight parameter is determined such that each portfolio contains all of the major holdings of the index. Based upon their respective weight in the index, additional securities are purchased to provide an appropriate industry diversification, substantially the same as the actual holdings in the index fund. Rebalancing ensures continued tracking of the index fund.

Trades of a specific security necessary to harvest tax losses or rebalance individual accounts are combined with similar trades for other accounts into a single block trade. Brokerage costs are shared among the individual investors, thereby decreasing the costs for managing the accounts. Upon completion of a trade, the brokerage fees and tax losses are allocated to each individual account. As trades are executed, purchased securities are stored in tax lots, wherein each tax lot associates the number of units of a given security purchased with the value of the security on the day of purchase. Therefore, each individual portfolio may include multiple tax lots of the same security purchased at different times, with a different base purchase value that is used as a comparison for tax harvesting purposes.

The rebalancing, tax loss harvesting, and trading functions are preferably performed automatically by computerized systems. Preferably, individual portfolios are stored and maintained by an automated accounting system. The rebalancing and tax loss harvesting functions are controlled by a second computer which automatically accesses external security exchange information on a daily basis, determines tax loss harvest securities and rebalance securities, and determines appropriate trades.

Trading may be automatically conducted by a trading computer, which automatically combines the trades from a number of portfolios to minimize brokerage fees, as described above, and electronically submits trades to the appropriate trading organization. Each of these computer systems is coupled to at least one of the other systems through a data link or bridge which allows for information to be transmitted electronically from system to system, thereby eliminating the need for human intervention in the control of the accounts. Although a system comprising a number of separate specific-purpose computers is described herein, it is readily apparent to one skilled in the art that the entire system could be embodied in a single software package and controlled by one general purpose computer, and that various functional blocks could be combined in different ways than as described above without departing from the invention.

It may therefore be seen that the present invention teaches a method and system of providing a financial investment product that provides diversified investments and tax loss harvesting for small to medium sized investors. The method and system of the invention provides an automated investment product for systematically harvesting tax losses.

The method and system of the invention also provides an automated investment product for small to medium investors for systematically rebalancing their investment portfolios to track an index fund. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 3 is a system diagram of one embodiment of an apparatus constructed in accordance with the present invention.

DETAILED DESCRIPTION OF THE PREFERRED EMBODIMENT

Figure 1:
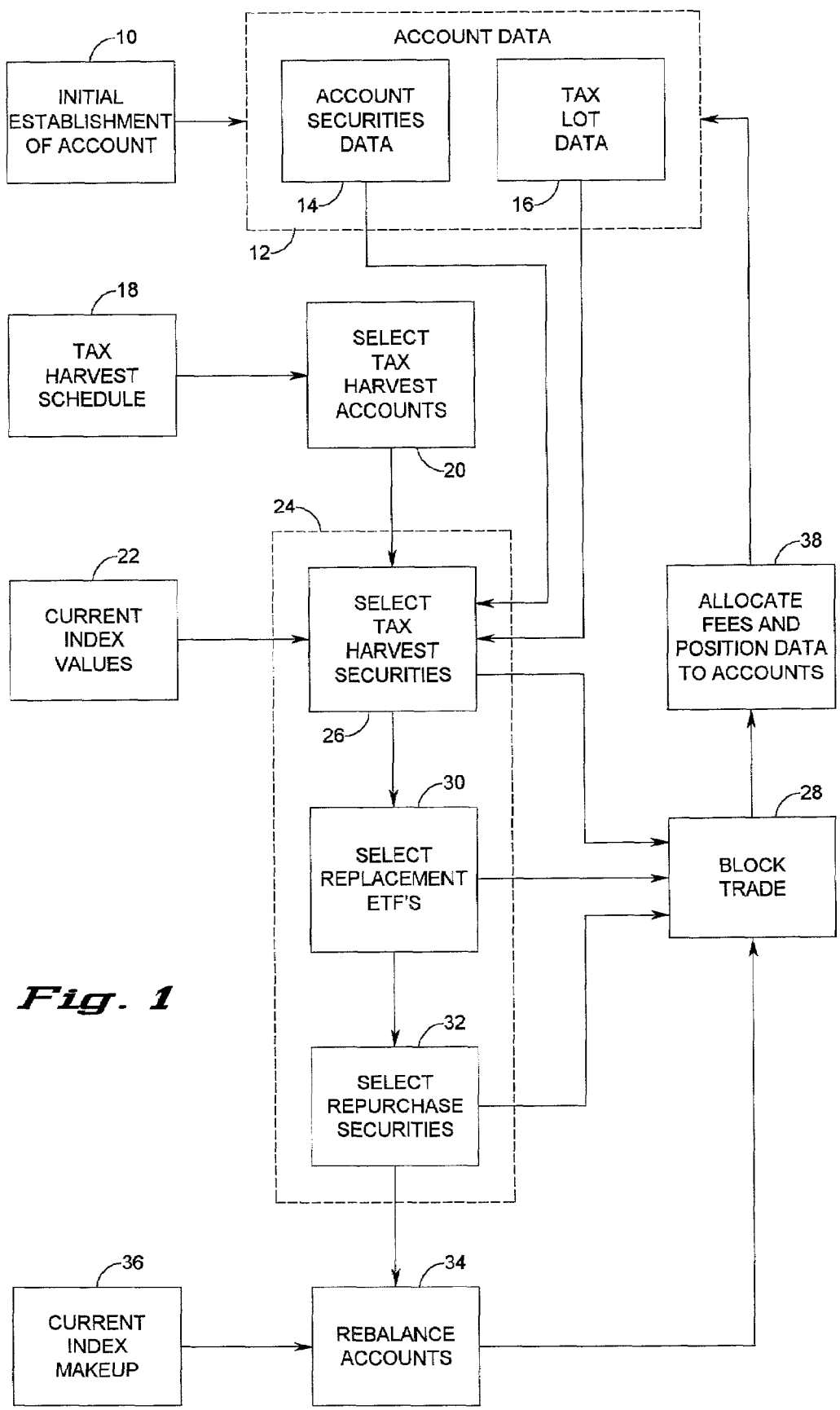
FIG. 1 is a block diagram showing one embodiment of the present invention.

A first version of the preferred embodiment is illustrated in FIG. 1, which shows a block diagram representing the general method employed to automatically provide a tax efficient portfolio in accordance with the present invention. Generally, the method of the present invention comprises the following five (5) steps: 1. establishing an individual account for each of a plurality of investors to track a selected index; 2. automatically selecting among the individual accounts for accounts having securities which are ready for tax loss harvesting; 3. automatically harvesting tax losses for the selected securities in the selected accounts; 4. purchasing temporary replacement securities in the same technical sector to maintain the appropriate industry balance in the account; and 5. automatically repurchasing selected securities sold to harvest tax losses after a period greater than that proscribed by Internal Revenue Service wash sale rules.

In the preferred embodiment, a sixth step to automatically rebalance each account to track the selected index is also performed. In the performance of the preferred embodiment, block trades are preferably executed as necessary for all indicated accounts (rather than for each account individually) to increase efficiency and decrease transaction fees, with all fees and position data being automatically allocated to each of the individual accounts involved in such trades. Each of these steps is defined more fully below.

As shown in FIG. 1, an individual account is initially established for each of a plurality of investors in an initial establishment of account step 10. Each individual account is modeled on an index (such as, for example, the S&P 500) to substantially track the performance of the selected index, while allowing for accounts which are significantly smaller than would be required if each individual investor were required to own all of the securities required to replicate the selected index. In the preferred embodiment, each account includes all of the securities in the index above a given capitalization weight, i.e. each of the top one hundred to one hundred ten securities by capitalization weight, in the relative weight that they are held in the selected index.

At present market values, this goal can be accomplished by including each of the securities in the selected index with a minimum position size greater than two tenths of one percent (0.20%) in each individual portfolio. It will be apparent to one of ordinary skill in the art that the number of securities held will be variable with the selected position size and market conditions. Furthermore, the position size is a variable that can be independently selected depending on the desired modeling characteristics of the implementation.

Selecting securities based solely on capitalization weight, however, distorts industry diversification in the portfolio, which may cause the modeled portfolio to act differently than the selected index itself, thereby causing tracking error. To prevent this error, additional securities are purchased collectively for all of the accounts in the portfolio to provide an industry diversification which is substantially similar to the industry diversification of the selected index as a whole.

Upon establishment of each portfolio, account data 12 for each account is maintained, typically with two basic types of information: the number of shares of each security in each account, which is stored as account securities data 14, and the cost basis or then present value of each individual security in each account, which is stored as tax lot data 16. The information stored for each security in the tax lot data 16 may be referred to as "stored historical cost value," which will be used as a reference point for comparison to the present value of each of the securities in each portfolio during the tax loss harvest process, which will be discussed below. This value generally is the cost basis of each of the securities in each account. In the embodiment illustrated in FIG. 1, each new portfolio is added to a group of portfolios which will be optimized (processed for tax loss harvesting and rebalancing) on the same day.

A predetermined tax harvest schedule 18, based on the Internal Revenue Service wash sale rules, determines when tax losses may be harvested for each group of accounts and that group of accounts may be rebalanced. Periodically (for example, daily or weekly), a group of individual accounts is selected for rebalancing and tax loss harvesting based on the predetermined schedule in a select tax harvest accounts step 20. In the preferred embodiment, the period established by the tax harvest schedule 18 between successive tax loss harvest operations is established based on Internal Revenue Service wash sale rules, as defined in 26 U.S.C. Section 1091. Alternately, another period of time may be used which also avoids the disallowance of loss recognition resulting from the sale of a security within the time periods prohibited by the statute. Presently, this period is established as a minimum of thirty-one (31) days.

Therefore, to effectively harvest tax losses, each individual account is evaluated for tax losses periodically at a minimum of thirty-one (31) days. Although a tax loss harvest period of thirty-one (31) days is described, it will be apparent to one of ordinary skill in the art that any time frame greater than the time frame established by the wash sale rules can be used. To harvest tax losses, it is necessary initially to determine the present market value of each security in the modeled index in a determine current index values step 22. These values provide a comparison to the stored historical cost value for each tax lot in each individual account for tax loss harvest purposes. Present market value information is preferably provided by electronically downloading data from a financial service provider, although market information could be obtained from any of a number of sources known to those skilled in the art via the Internet, entered manually, or obtained in other ways known to those skilled in the art.

Once the present market values of each of the securities in the account are known, the process begins a tax loss harvesting process 24 in which a comparison is initially made to each stored historical cost value to determine which of the tax lots for each individual account should be harvested for losses in a select tax harvest securities step 26. The present market value of each security in each individual account is compared to the stored historical cost value of the tax lot for that security. The difference in value is compared to a predetermined loss threshold, which is preferably selected based on the following factors: 1. tax benefit of a sale to the account holder; 2. transaction costs of the sale to the individual account holder; and 3. tracking error of the index.

Under present market conditions, the tax loss threshold of the preferred embodiment has been experimentally selected to be in a range between approximately ten percent (10%) and fifteen percent (15%), and most preferably, at a fifteen percent (15%) loss when the present market value is compared to the stored loss value. However, the optimum value may vary depending on present market conditions, the goals of the individual investor, or other factors. In some cases, for example, an investor may prefer to maximize tax benefit regardless of tracking error or transactional costs. In this case, a different threshold value may be appropriate.

Upon completion of the select tax harvest securities step 26, a list of each of the securities to be sold in each account ("tax loss harvest securities") is stored for purposes of making a block trade in a block trade step 28, as will be defined below. Furthermore, an evaluation is performed to determine which securities to purchase ("replacement securities") to temporarily replace the tax loss harvest securities during the wash sale delay period in a select replacement securities step 30 (also contained in the tax loss harvesting process 24).

While in the parent of the present application the replacement securities are selected to maintain the appropriate industry balance in the account after the tax loss harvest securities are sold, the preferred embodiment of the present invention uses shares of exchange traded funds (ETF's), which are closed-end funds, in the same industry segment as the securities which are being sold. A list of the exchange traded funds being acquired is also compiled for purposes of making a block trade in the block trade step 28.

A third list of securities which are now to be repurchased is generated in a select repurchase securities step 32 (also contained in the tax loss harvesting process 24) for purposes of making a block trade in the block trade step 28. This list comprises those securities which were sold for tax loss harvest purposes during the last tax loss harvest evaluation (or, if evaluations take place more frequently than the minimum wash sale period, those securities which were sold at least the minimum period earlier). Such repurchases will also trigger the sale of corresponding exchange traded funds which were acquired upon the previous tax harvesting sale of the securities being repurchased. Preferably, only "core" securities (those selected based on their capitalization weight) which are sold for tax loss harvesting are repurchased. Other securities are repurchased only if selected in the rebalancing procedure.

Upon completion of the tax loss harvesting process 24, all of the selected accounts are rebalanced based on the desired capitalization weight and industry balance parameters in a rebalance accounts step 34. Rebalancing assures that each individual account will continue to track the performance of the selected index, information on which is provided in a current index makeup step 36. The securities to be bought for and sold from individual accounts for rebalancing purposes are also compiled for purposes of making a block trade in the block trade step 28.

Upon completion of the rebalance accounts step 34, block trades are made in the block trade step 28, in which the net amounts of each of the securities designated to be bought and sold from all of the involved accounts are traded. Upon completion of the trades, account position data is allocated to each account, and brokerage fees for the block trades are allocated among each of the accounts on a pro rata basis in an allocate fees and position data to accounts step 38. As noted above, the account data preferably includes tax lots, where the tax lots track both the amount of each security purchased and the purchase price. Therefore, if more than one purchase is made for a given security, multiple tax lots with varying tax bases will be stored. Tax harvest analyses will be performed separately for each tax lot.

Figure 2:
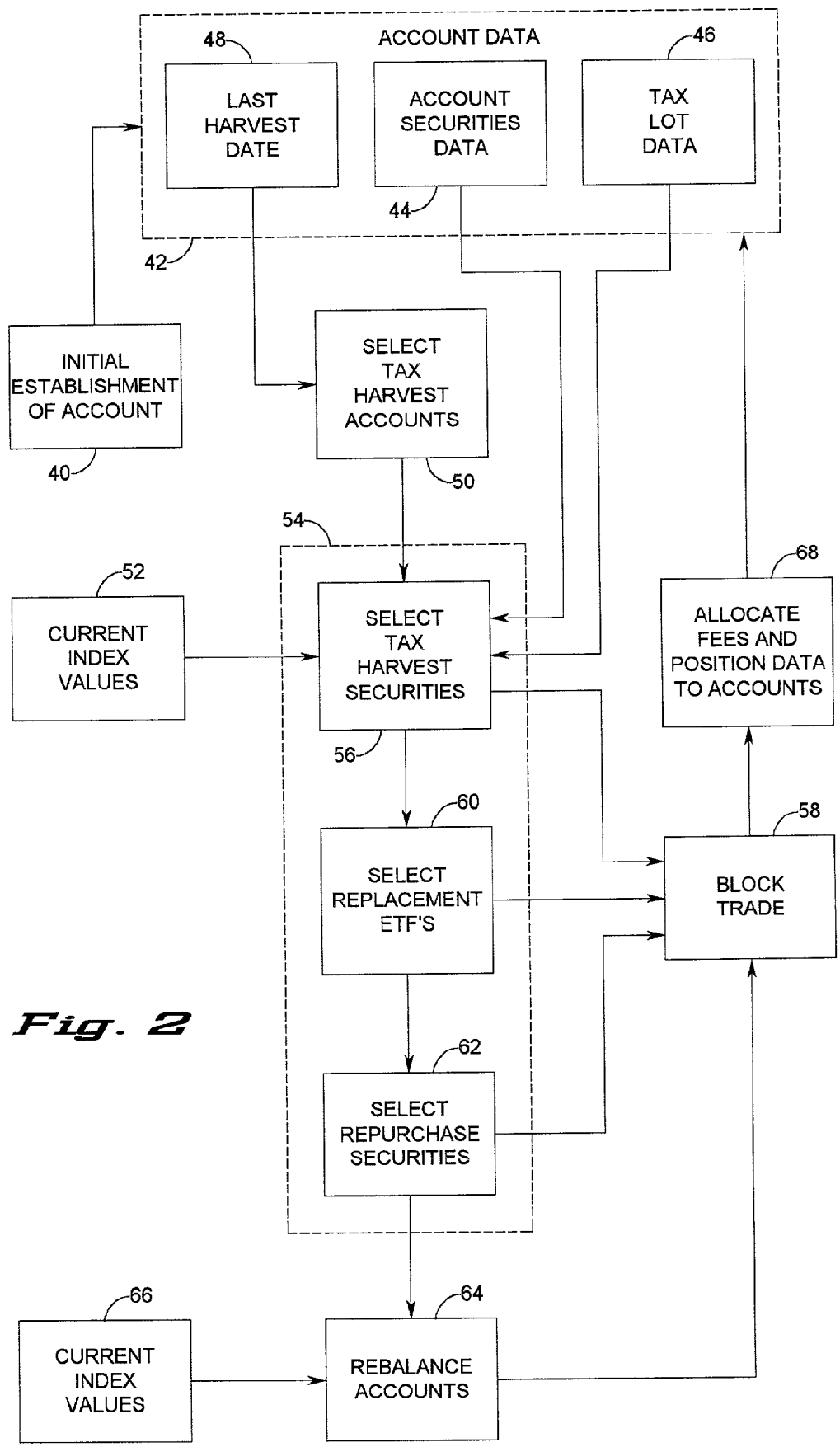
FIG. 2 is a block diagram showing an alternative embodiment of the present invention.

Referring next to FIG. 2, an alternate embodiment is illustrated in which the date the account was established is stored as an initial benchmark for determining when the account should be rebalanced and evaluated for tax loss harvest purposes. An individual account is initially established for each of a plurality of investors in an initial establishment of account step 40. Upon establishment of each portfolio, account data 42 for each account is maintained, typically with three basic types of information: the number of shares of each security in each account, which is stored as account securities data 44, the historical cost or then present value of each individual security in each account, which is stored as tax lot data 46, and the "last loss harvest date," which is stored as last harvest date data 48. In this embodiment, the last harvest date is initially established upon setting up the account, and then is updated upon completion of each successive tax loss harvest, with the difference between consecutive dates being at least as long as the time period required by Internal Revenue Service wash sale rules (thirty-one (31) days).

Periodically, a number of individual accounts are selected as a group for rebalancing and tax loss harvesting based upon their respective predetermined schedules being identical in a select tax harvest accounts step 50. To harvest tax losses, it is necessary initially to determine the present market value of each security in the modeled index in a determine current index values step 52. Present market value information may again be provided by electronically downloading data from a financial service provider, or obtained in other ways known to those skilled in the art.

Once the present market values of each of the securities in the account are known, the process begins a tax loss harvesting process 54 in which a comparison is initially made to each stored historical cost value to determine which of the tax lots for each individual account should be harvested for losses in a select tax harvest securities step 56. The present market value of each security in each individual account is compared to the stored historical cost value of the tax lot for that security. The difference in value is again compared to a predetermined loss threshold, as described above. That tax loss threshold of the preferred embodiment ranges between approximately ten percent (10%) and fifteen percent (15%), although a different threshold value may be appropriate.

Upon completion of the select tax harvest securities step 66, a list of each of the securities to be sold in each account ("tax loss harvest securities") is stored for purposes of making a block trade in a block trade step 68. Furthermore, an evaluation is performed to determine which securities to purchase ("replacement securities") to temporarily replace the tax loss harvest securities during the wash sale delay period in a select replacement securities step 60 (also contained in the tax loss harvesting process 54).

The preferred embodiment of the present invention uses shares of exchange traded funds (ETF's), which are closed-end funds, in the same industry segment as the securities which are being sold. A list of the exchange traded funds being acquired is also compiled for purposes of making a block trade in the block trade step 58.

A third list of securities to be repurchased is generated in a select repurchase securities step 62 (also contained in the tax loss harvesting process 54) for purposes of making a block trade in the block trade step 58. These securities were sold for tax loss harvest purposes during the last tax loss harvest evaluation (or, if evaluations take place more frequently than the minimum wash sale period, they were sold at least the minimum period earlier). Such repurchases will also trigger the sale of corresponding exchange traded funds which were acquired upon the previous tax harvesting sale of the securities being repurchased.

Upon completion of the tax loss harvesting process 54, all of the selected accounts are rebalanced based on the desired capitalization weight and industry balance parameters in a rebalance accounts step 64. Information on the selected index is provided in a current index makeup step 36. The securities to be bought and sold from individual accounts for rebalancing purposes are also compiled for purposes of making a block trade in the block trade step 58.

Upon completion of the rebalance accounts step 64, block trades are made in the block trade step 58, in which the net amounts of each of the securities designated to be bought and sold from all of the involved accounts are traded. Upon completion of the trades, account position data is allocated to each account, and brokerage fees for the block trades are allocated among each of the accounts on a pro rata basis in an allocate fees and position data to accounts step 68. As noted above, the account data includes tax lots, where the tax lots track both the amount of each security purchased, the purchase price, and the purchase date. Therefore, if more than one purchase is made for a given security, multiple tax lots with varying tax bases will be stored. Tax harvest analyses will be performed separately for each tax lot.

Although two embodiments have been shown and described, it will be apparent to one skilled in the art that other embodiments could provide a similar function. Generally, the present invention comprises the steps of establishing individual accounts modeled on an index to substantially track the performance of the index. Preferably, the modeled accounts comprise a reduced set of securities such that each investor owns a subset of the securities in the index, thereby enabling small to medium-sized investors the opportunity to purchase all of the securities in the modeled account.

Because the investor individually owns each security, tax losses realized from selling securities can be used by each investor, consistent with applicable tax laws, to offset realized capital gains in the account and ordinary income or gains outside of the account. Furthermore, block trading minimizes the brokerage fees for each investor, thereby decreasing the cost of managing each account. The use of automatic tax loss harvesting and automatic rebalancing of the account minimizes the amount of human intervention required, thereby further reducing costs by reducing management fees, and reducing errors which can be introduced by the decisions of account managers. Thus, the present invention makes it possible for small to medium-sized investors to invest in tax efficient accounts which substantially track an index. Tax management is preferably active, while the management of the securities held in the account is passive.

Furthermore, although the tax loss harvesting and account rebalancing has been shown in a specific order, the order is for illustrative purposes only. It will be apparent to one skilled in the art that the tax loss harvesting and account rebalancing functions could be performed in any of a number of orders or ways, and is mainly dependent on the design or selection of the rebalancing or optimization software. For example, although the tax loss harvest procedure is shown prior to the rebalancing procedure, this order could be reversed.

Referring now to FIG. 3, a system overview of a tax efficient investment system 70 which is constructed in accordance with the first preferred embodiment of the present invention. Generally, the present invention comprises a computing system with the following modules: 1. an accounting system 72 for calculating and maintaining account position data; 2. an optimization system 74 for harvesting tax losses of individual accounts and for optimizing the accounts to track the selected index; and 3. a trading system 76 for compiling and executing selected block trades. The tax efficient investment system 70 preferably further comprises an account maintenance system 78 which provides an interface for account managers or users to enter or modify account information in the accounting system 72.

In the preferred embodiment, communications between these various systems are provided through electronic communication ports coupled to each system. The communication links are preferably provided over a local area network, but could be provided via any type of modem connections, through wide area networks, via internet or e-mail communication links, or through a number of different hard wired or wireless communication links. Although the communications links are described below in terms of information transmitted to or from a given system, it will be apparent to one skilled in the art that all of these communications links may be bi-directional, and that a number of different types of information may be transmitted between the various systems.

The accounting system 72 of the preferred embodiment could be, for example, a general purpose main frame computer having communications ports for transmitting data to and/or receiving data from the optimization system 74, the trading system 76, the account maintenance system 78, and to third parties as indicated by the reference numeral 80. The accounting system 72 would further includes a data storage component 82 for maintaining account position data, historical transaction information, tax lots for individual securities, and past value pricing information for tax loss harvesting purposes.

Software in the accounting system 72 provides communications between the various other components of the system, and maintains the individual accounts. In particular, the accounting system 42 allocates position data to each individual account, allocates tax losses to individual accounts, and allocates brokerage fees among the individual accounts.

The communications port 56 can be coupled to any of a number of external communication links including local and wide area networks, modem links, and other devices to provide online, real-time access to information. In the preferred embodiment, the accounting system 72 is also connected to third parties as indicated at 80 via the Internet which allows users and brokers easy access to account information. Although a general purpose mainframe computer has been described, it is apparent to one skilled in the art that any number of different types of computing devices could provide a similar function. Furthermore, the various functions provided by the accounting system 72 could be provided by a number of separate computing devices.

The account maintenance system 78 preferably comprises an input terminal which may be a personal computer, a terminal coupled to the accounting system 72, a remote personal computer, or any of a number of local or remote input devices including telecommunication devices, fax input devices, scanners, etc. The account maintenance system 78 provides an interface for investment counselors or users to enter and modify account data for individual accounts. Information can be directly entered by a user or downloaded from a remote location.

The optimization system 74 is preferably provided on a network server, but could also be provided by any of a number of computing devices as will be apparent to those skilled in the art. In the preferred embodiment, the optimization system 74 includes communications ports for receiving data from position and tax lot data from the accounting system 72, for transmitting trade information to the trade system 76, and for receiving current market information 84 from an external service provider or other source.

Software in the optimization system 74 provides the functions of rebalancing the individual portfolios to track the selected index, selecting securities for tax loss harvesting, and providing trade information to the trading system 76. Software in the optimization system 74 also provides communications to the accounting system 72, the trading system 76, and the external service provider through the ports mentioned above.

In the preferred embodiment of the invention, the optimization system 74 may use the Equator optimization software from Wilshire Associates Incorporated, modified to provide communications links to the accounting system 72 and trading system 76. The Equator system, or another selected optimization system, preferably models and tracks the S&P 500. However, it will be apparent to those of ordinary skill in the art that any of a number of known indexes including the S&P 400, the Russell 2000, the S&P 600, etc., could instead be used as the basis for the system. Furthermore, although the Equator optimization software is preferred, the optimization software could also be provided by other software packages or by specially-designed proprietary software.

The trading system 76 is also preferably provided on a network server. The trading system 76 includes communications port for coupling the trading system 76 to the accounting system 72, for receiving information from the optimization system 74, and for coupling the trading system 76 to an external trading system, such as a DOT trading computer 86. In the preferred embodiment, the trading system may be the LandMark Electronic Trading Module, developed by LongView Group, wherein the software has been modified to provide communication links with the accounting system 72 and the optimization system 74. However, any software package which provides a trading interface, or proprietary software could also be used.

In operation, individual account information is preferably entered into an account maintenance system 78 coupled to the accounting system 72, as described above. The initial account data is transmitted to the optimization system 74 to establish an individual portfolio. The optimization system 74 determines the securities to be purchased for a given account based on the capitalization weight of each security in the index and an industry balance parameter. As explained above, each account preferably includes all of the securities having a capitalization weight above a predetermined threshold value, in proper proportion to their representation in the index.

The remaining securities in the account are selected by the optimization system 74 to provide an industry balance equivalent to that of the index as a whole. After the securities in the system are selected, security purchase information is transmitted to the trading system 76, which in turn purchases the selected securities. The account position data is then transmitted from the trading system 76 to the accounting system 72 and stored in the data storage component 82 by the accounting system 72, along with an initial account opening date. The accounting system 72 also maintains historical transaction data, including the initial last harvest date as defined above. This data is stored for use by the optimization system 74 in calculating tax losses for tax loss harvesting purposes, as will be described below.

Periodically (for example, daily or weekly), selected accounts are evaluated for rebalancing and tax loss harvesting. Individual account holdings may be rebalanced to ensure that the accounts will model the performance of the index. The selected accounts may also be harvested for tax losses, consistent with time frames to avoid application of Internal Revenue Service wash sale rules. Preferably, a database identifying groups of individual accounts to be rebalanced is maintained, based on the opening date of the account. A predetermined schedule establishes when the account is to be rebalanced. The schedule may be maintained by the accounting system 72, by the optimization system 74, or by an external system. Alternatively, the accounting system 72 can maintain a database including the last date on which each of the individual accounts was last evaluated for tax loss harvesting (the last tax loss harvest date, as defined above). The accounting system 72 can use this data to determine when each account should be evaluated for tax loss harvesting purposes.

The rebalancing process includes again evaluating the securities held in the index based on capitalization weight, and trading securities to ensure that the industry balance parameter is maintained. As described above with respect to establishing an account, the rebalancing is performed by the optimization system 74. Account position data for each individual account is transmitted from the accounting system 72 to the optimization system 74, which selects securities to be traded based on capitalization weight and industry balance parameters.

As noted above, each selected individual account is also evaluated for purposes of harvesting tax losses. To evaluate tax lots, the stored historical values for each security in an individual account is compared to the market value by the optimization system 74. If losses in the value of a given tax lot exceed a predetermined threshold, the optimization system 74 selects the security in the tax lot to be traded and transmits data identifying the securities to be traded to the trading system 76. Based on the industry balance parameter, the optimization system 74 further selects replacement securities to be held in the portfolio until the next tax loss harvesting process is conducted for the identified individual portfolio and identifies these temporary replacement securities to the trading system 76.

In the preferred of the present invention, shares of exchange traded funds (ETF's) in the same industry segment as the securities which are being sold are selected as temporary replacement securities. The temporary replacement securities will then be held in the account until the next tax loss harvest evaluation (or, if evaluations take place more frequently than the minimum wash sale period, until the expiration of the minimum wash sale period) At that time, the temporary replacement securities will be sold and the securities which were sold for tax loss harvest purposes will be repurchased.

Data indicating the securities selected to be traded (both bought and sold)is transmitted to the trading system 76. Trade data is preferably stored until all of the accounts have been rebalanced and tax loss harvested, such that a single block trade of all of a specific security can be transmitted. Preferably, the trading system 76 compiles the trades to execute a single trade for each security to be bought or sold. However, it will be apparent to those skilled in the art that this function could instead be provided in the optimization system 74 or elsewhere in the overall system. Furthermore, depending on the method used for processing accounts, block trades could be made periodically as the accounts are rebalanced or evaluated for tax loss harvesting purposes. As noted above, the step of forming block trades minimizes the brokerage fees associated with each account.

To execute a trade, trade orders are transmitted from the trading system 76 to an external trading interface 86. The trading interface 86 completes the trade, and executed trade information is then transmitted back to the trading system 76. The trading system 76 in turn transmits this data back to the accounting system 72, along with brokerage fee information. The accounting system 72 then allocates the trade and brokerage fee information to each of the individual accounts.

Although an accounting system comprising a plurality of individual computers has been described, it will be apparent to one of ordinary skill in the art that the described system could be implemented in a single computer. Furthermore, many of the described functions could be combined or separated to provide different functional blocks executed by different computers or software routines.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method for passively managing an investment portfolio comprising a plurality of securities and for actively managing tax lots to automatically maximize investor wealth, the method comprising the following steps:

constructing an investment portfolio comprised of a plurality of securities;

periodically calculating a difference between a present value and a past value for each of at least some of the plurality of securities comprising the investment portfolio;

automatically selling the securities to harvest tax losses when the difference between the present value and the past value of the security is determined to reach or exceed a predetermined tax loss threshold;

purchasing shares of funds to temporarily replace the sold securities; and after a minimum delay period, repurchasing the securities sold to harvest tax losses and selling the shares of funds used to temporarily replace them.

2. A method as defined in claim 1, wherein said constructing step comprises:
constructing the investment portfolio to substantially replicate the performance of an index.

3. A method as defined in claim 2, wherein the index being replicated is the Standard & Poor's 500 (S&P 500).

4. A method as defined in claim 2, wherein the step of constructing the portfolio further comprises:
comparing a plurality of securities comprising the index to a capitalization weighting parameter;
selecting the securities which exceed a capitalization threshold;
comparing a resultant portfolio to an industry balance parameter; and
adding securities which do not exceed the capitalization weighting parameter to the investment portfolio to provide an industry balance which is substantially equivalent to the industry balance parameter.

5. A method as defined in claim 4, wherein the at least some of the plurality of securities for which the difference between the present value and the past values is calculated comprises those securities which exceed the capitalization threshold.

6. A method as defined in claim 2, additionally comprising:
periodically rebalancing the investment portfolio to substantially replicate the performance of the index.

7. A method as defined in claim 6, wherein the step of rebalancing comprises:
comparing a plurality of securities comprising the index to a capitalization weighting parameter;
selecting the securities which exceed a capitalization threshold;
comparing a resultant portfolio to an industry balance parameter; and
adding securities which do not exceed the capitalization weighting parameter to the investment portfolio to provide an industry balance which is substantially equivalent to the industry balance parameter.

8. A method as defined in claim 6, wherein the time period between each successive rebalancing of the investment portfolio is at least equivalent to the time period required by the Internal Revenue Service wash sale rules.

9. A method as defined in claim 1, wherein the predetermined tax loss threshold is in a range between about ten and about fifteen percent.

10. A method as defined in claim 1, wherein the predetermined tax loss threshold is approximately fifteen percent.

11. A method as defined in claim 1, wherein the shares of funds are in the same industry segment as the securities which are being sold.

12. A method as defined in claim 1, wherein the shares of funds comprise exchange traded funds (ETF's).

13. A method as defined in claim 1, wherein the minimum delay period comprises the period of time required by Internal Revenue Service wash sale rules.

14. A method for managing a tax efficient portfolio for each of a plurality of investors, the method comprising the following steps:
constructing an investment portfolio comprising a plurality of securities selected to substantially replicate the performance of an index;
establishing an individual portfolio for each of the plurality of investors wherein each investor owns shares in at least some of the securities comprising the investment portfolio;
periodically determining a change in value between a present value and a past value of each of the at least some securities owned by at least some of the investors and comparing the change in value to a predetermined tax loss threshold to identify tax harvest securities;
selling the tax harvest securities;
purchasing shares of funds to temporarily replace the sold securities;
after at least a minimum delay period required by Internal Revenue Service wash sale rules, repurchasing the securities sold as tax harvest securities.

15. A method as defined in claim 14, additionally comprising:
periodically rebalancing the investment portfolio to substantially replicate the performance of the index.

16. A method as defined in claim 15, wherein the period of time between successive rebalancing steps is substantially equivalent to the period of time between successive tax harvesting operations.

17. A method as defined in claim 14, additionally comprising:
combining the tax harvest securities to be sold at a given point in time from the accounts of multiple investors to form a block trade of each of the tax harvest securities;
combining the shares of each fund to be bought and/or sold at a given point in time from the accounts of multiple investors to form a block trade of each of the funds;
combining the securities to be repurchased at a given point in time for the accounts of multiple investors to form a block trade of each of the repurchased securities; and
executing the block trades of securities and funds.

18. A method as defined in claim 17, additionally comprising:
allocating the corresponding tax loss from the block sales of tax harvest securities to the appropriate ones of each of the plurality of investors; and
allocating the brokerage costs from the block sales of the tax harvest securities, the block purchases of the replacement securities, and the purchase or sale of the funds to the appropriate ones of each of the plurality of investors.

19. A method as defined in claim 14, wherein the number of securities in the investment portfolio is less than the number of securities held in the index.

20. A method as defined in claim 14, wherein securities in the index which have a capitalization weight in the index of at least a predetermined percentage are owned by each investor, and wherein securities in the index which have a capitalization weight in the index of less than the predetermined percentage are not owned by each owner but rather are commonly held with each investor having an ownership interest proportionate to the relative size of that owner's overall position.

21. A method as defined in claim 20, wherein the predetermined percentage is approximately three tenths of one percent.

22. A method as defined in claim 14, further comprising the step of allocating an individual position and an individual tax lot for each investor.

23. A method as defined in claim 14, wherein the shares of funds are in the same industry segment as the tax harvest securities which are being sold.

24. A method as defined in claim 14, wherein the shares of funds comprise exchange traded funds (ETF's).

25. An apparatus for automatically harvesting tax losses and rebalancing an investment portfolio, the apparatus comprising:
- an accounting system for maintaining position data and tax data for at least one individual portfolio;
- a tax lot harvesting system for calculating a difference between a present value and a past value of selected securities in the investment portfolio, comparing the difference to a predetermined tax loss threshold, and ordering a tax loss harvest sale of such tax loss harvest securities when the difference exceeds the predetermined threshold;
- a temporary fund management system for ordering the purchase of shares of funds to replace tax loss harvest securities to be sold, and for ordering the sale of shares of funds held for at least a predetermined time;
- a security repurchase management system for repurchasing tax loss harvest securities at least the predetermined time after they have been sold; and
- a trading system for causing an external trading system to execute a trade in response to the sales and purchase orders from the tax lot harvesting system, the temporary fund management system, and the security repurchase management system.

26. An apparatus as defined in claim 25, additionally comprising:
- a rebalancing system for optimizing an investment portfolio to track a selected index based on a capitalization weight parameter and an industry balance parameter and, when rebalancing is required, for producing a trade signal indicating the quantity of at least one of a plurality of securities in the investment portfolio to sell and at least one security in the index to buy.

27. An apparatus as defined in claim 25, wherein the trading system transmits executed trade and tax lot data to the accounting system.

28. An apparatus as defined in claim 25, wherein the accounting system allocates an account position for each executed trade and a tax lot to each of the individual portfolios.

29. An apparatus as defined in claim 25, wherein the difference in time between the past value and the present value is at least equivalent to the time period required by Internal Revenue Service wash sale rules.

30. An apparatus as defined in claim 25, further comprising a trading data interface for receiving current security price data.

31. An apparatus as defined in claim 25, wherein the shares of funds are in the same industry segment as the securities which are being sold.

32. An apparatus as defined in claim 25, wherein the shares of funds comprise exchange traded funds (ETF's).

* * * * *